US008556757B2

(12) United States Patent
Kilshaw

(10) Patent No.: US 8,556,757 B2
(45) Date of Patent: Oct. 15, 2013

(54) BICYCLE GEAR MECHANISM

(76) Inventor: Richard J. Kilshaw, Lake Oswego, OR (US)

(*) Notice: Subject to any disclaimer, the term of this patent is extended or adjusted under 35 U.S.C. 154(b) by 0 days.

(21) Appl. No.: 13/306,151

(22) Filed: Nov. 29, 2011

(65) Prior Publication Data

US 2012/0071284 A1 Mar. 22, 2012

Related U.S. Application Data

(63) Continuation of application No. 12/075,877, filed on Mar. 17, 2008, now Pat. No. 8,066,596, which is a continuation-in-part of application No. 10/908,881, filed on May 31, 2005, now Pat. No. 7,361,109.

(51) Int. Cl.
*F16H 9/00* (2006.01)

(52) U.S. Cl.
USPC .................................. 474/81; 474/79; 474/80

(58) Field of Classification Search
USPC ....................................................... 474/78–81
See application file for complete search history.

(56) References Cited

U.S. PATENT DOCUMENTS

| 7,258,637 B2* | 8/2007 | Thomasberg | 474/78 |
| 7,361,109 B2* | 4/2008 | Kilshaw | 474/81 |
| 7,585,240 B2* | 9/2009 | Kamada | 474/160 |
| 7,597,638 B2* | 10/2009 | Cooke | 474/78 |
| 2004/0067804 A1* | 4/2004 | Dratewski | 474/78 |
| 2006/0058131 A1* | 3/2006 | Cooke | 474/78 |

* cited by examiner

*Primary Examiner* — Sang Kim
(74) *Attorney, Agent, or Firm* — Timothy E. Siegel Patent Law, PLLC; Timothy E. Siegel

(57) ABSTRACT

A bicycle gear assembly comprises first and second sets of cog wheels, each having at least three cog wheels of various sizes including a largest cog wheel and a smallest cog wheel. These two sets are oriented so that the largest cog wheel of the first set is aligned with the smallest cog wheel of the second set and vice versa, the first and the second sets of cog wheels define at least a first, second and third pair of substantially aligned cog wheels. Additionally, a chain is mounted about a first pair of the aligned cog wheels and a gear shift assembly is adapted to move the chain from the first pair of substantially aligned cogwheels to the second pair of substantially aligned cogwheels and from the second pair of substantially aligned cogwheels to the third pair of substantially aligned cogwheels.

29 Claims, 4 Drawing Sheets

BICYCLE GEAR MECHANISM

RELATED APPLICATION

This application is a continuation of application Ser. No. 12/075,877, filed Mar. 17, 2008, now U.S. Pat. No. 8,066,596, which was a continuation-in-part of application Ser. No. 10/908,881, filed May 31, 2005, now U.S. Pat. No. 7,361,109.

BACKGROUND OF THE INVENTION

Since the advent of mountain biking, there has been a perceived need for a bicycle gearing system that both is resistant to being derailed by debris that is accidentally kicked up into the gear set by a bicycle rider and yet offers a wide range of gearing. Toward this goal gearing systems have appeared in the literature, in which the gears are encased in a protective housing.

In these new systems a drive wheel may be co-journalled with a driven set of gears and, in turn, drive a cog wheel on the bicycle's rear wheel. Unfortunately, these systems do not have as wide a range of gearing options as some mountain biking enthusiasts might desire. Moreover, the inner workings of some gear box designs are fairly complicated, resulting in a gear box that is heavier and more prone to larger frictional losses and rapid wear than is desirable.

SUMMARY

The following embodiments and aspects thereof are described and illustrated in conjunction with systems, tools and methods which are meant to be exemplary and illustrative, not limiting in scope. In various embodiments, one or more of the above-described problems have been reduced or eliminated, while other embodiments are directed to other improvements.

In a first separate aspect, the present invention takes the form of a gear assembly has a first and a second cog wheel and a chain mounted about the first and second cog wheel. In addition, third and fourth cog wheels are co-axial to the second cog wheel, thereby forming a cog wheel set. Also, a gear change assembly, including a loaded chain pushing element is adapted to push against a load bearing portion of the chain, to transition the chain amongst the cog wheels of the cog wheel set.

In a second separate aspect, the present invention takes the form of a gear assembly having a first co-axial cogwheel set defining a first rotational axis, and including a first-set first cogwheel and a first-set second cogwheel of different sizes and a second co-axial cogwheel set defining a second rotational axis, parallel to and displaced from the first rotational axis, and including a second-set first cogwheel and a second-set second cogwheel of different sizes. A chain is engaged with the first-set first cogwheel and the second-set first cogwheel, thereby defining a first operational chain alignment plane, operationally normal to the cogwheel set rotational axis, and a multi-step gear changing assembly is adapted to transition the chain from the first-set first cogwheel to the first-set second cogwheel, thereby defining a first step gear change and a second operational chain alignment plane, and from the second-set first cogwheel to the second-set second cogwheel, thereby defining a second step gear change and a third operational chain alignment plane. The gear assembly provides first, second and third operational gearing ratios at each operational chain alignment plane.

In addition to the exemplary aspects and embodiments described above, further aspects and embodiments will become apparent by reference to the drawings and by study of the following detailed descriptions.

BRIEF DESCRIPTION OF THE DRAWINGS

Exemplary embodiments are illustrated in referenced figures of the drawings. It is intended that the embodiments and figures disclosed herein are to be considered illustrative rather than restrictive.

FIG. 4 is a detail sectional side view, taken along line 4-4 of FIG. 2.

FIG. 5 is a detail sectional side view, taken along line 5-5 of FIG. 2.

DETAILED DESCRIPTION OF THE PREFERRED EMBODIMENT(S)

Figure 1:
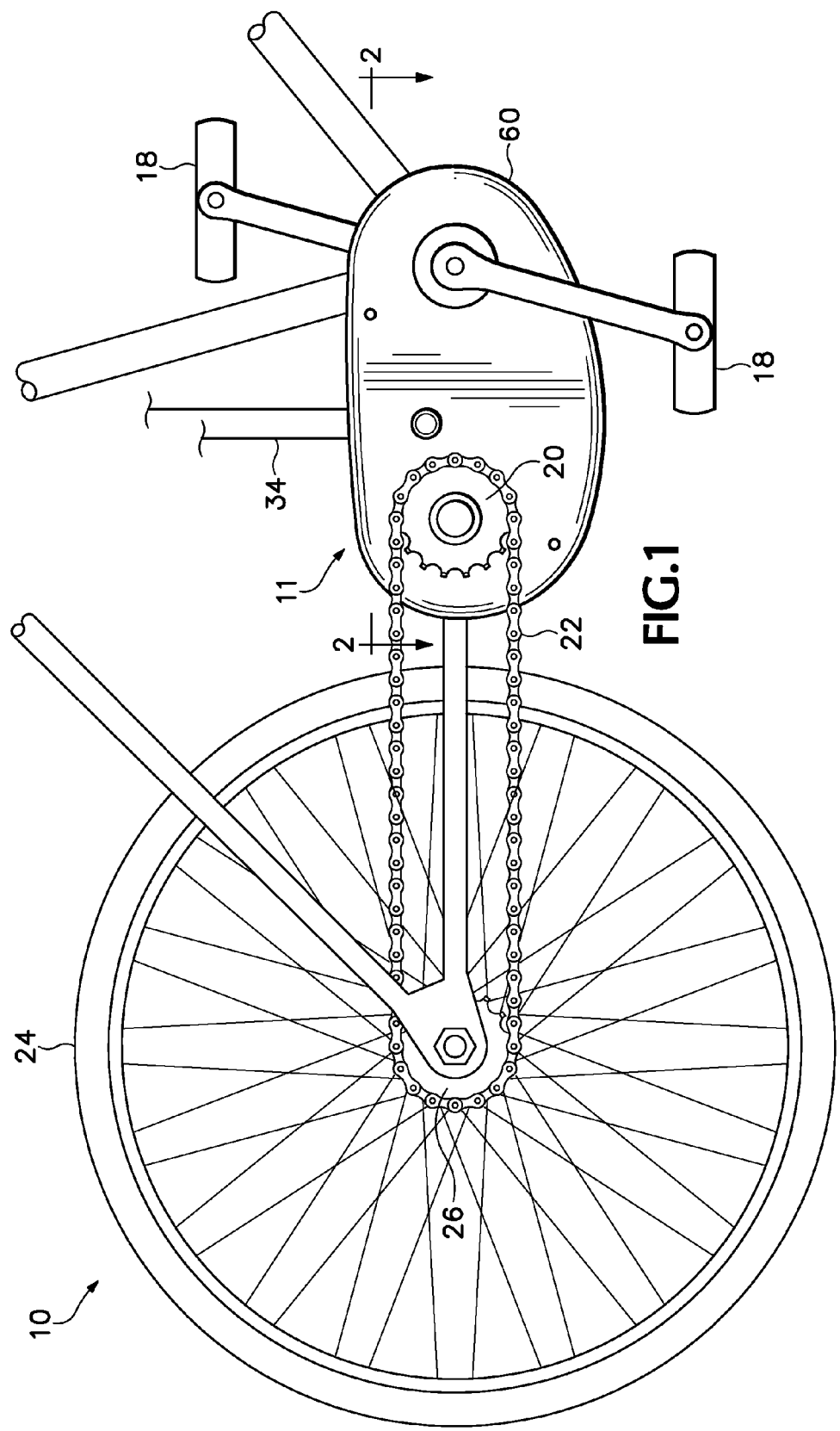
FIG. 1 is a partial side view of a bicycle, including a gear box as in the present invention.
Figure 2:
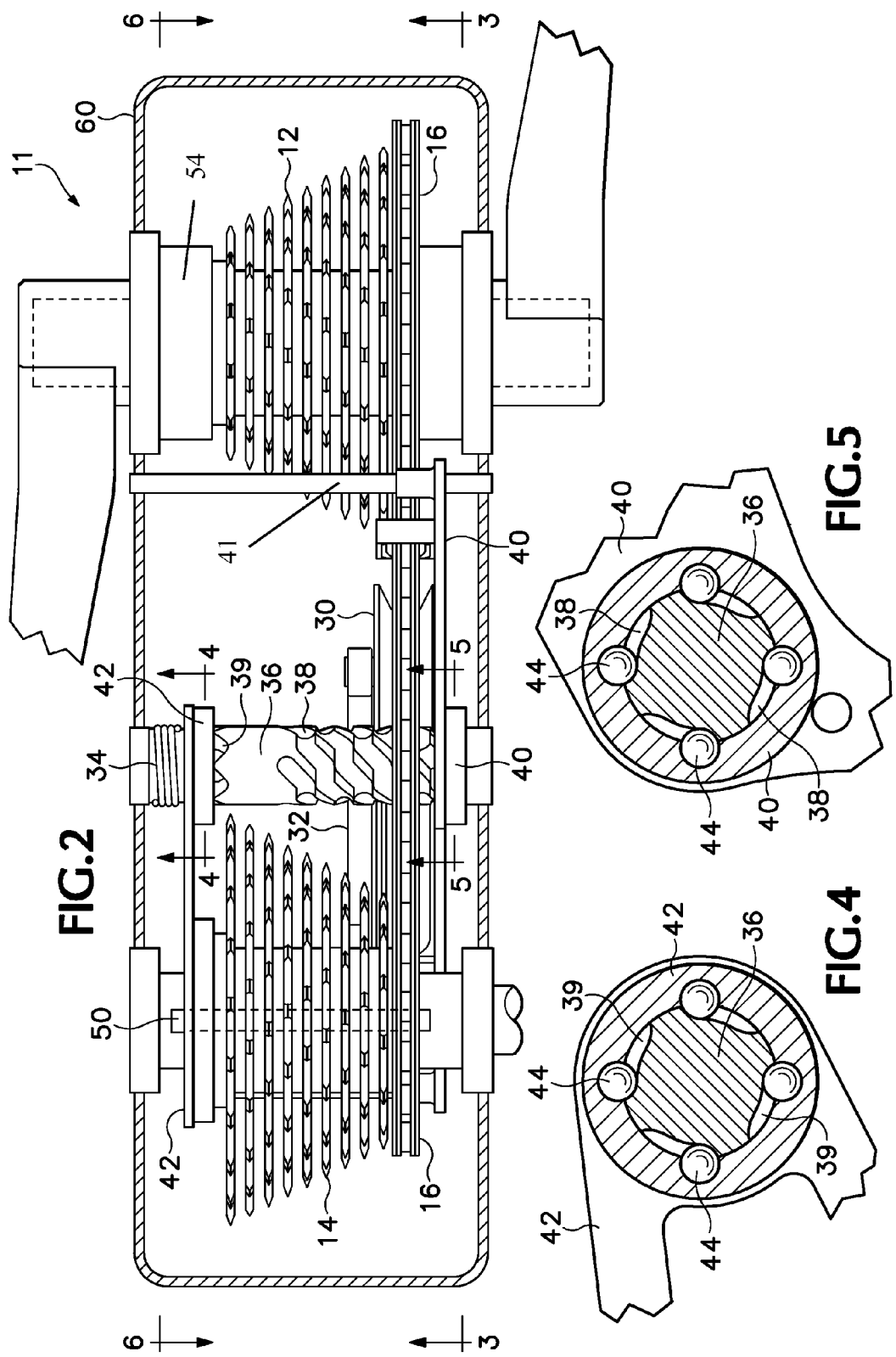
FIG. 2 is a downwardly looking sectional view taken along lines 2-2 of FIG. 1.

Referring to FIG. 1, a bicycle 10 includes a preferred embodiment of a bicycle gear assembly 11. Turning to FIG. 2, assembly 11 includes a co-journalled, or stated slightly differently, co-axial, drive cog wheel set 12, a co-axial driven cog wheel set 14 and a chain 16 linking a cog wheel on set 12 with a cog wheel on set 14. Drive cog wheel set 12 is driven by a pair of pedals 18 (FIG. 1) and driven cog wheel set 14 is driven by way of chain 16, from set 12. Referring again to FIG. 1, the driven set 14, is coupled to a stand-alone drive cog wheel 20 that powers a chain 22, that, in turn, powers a bicycle rear wheel 24 by way of a rear wheel cog wheel 26. In an alternative preferred embodiment, chain 22 is replaced by an alternative type of tension-member loop, such as a belt or cable.

A tension roller 30, preferably made of durable polymer and having an outer rim that defines a channel or groove for accepting the chain 16, is mounted on a roller arm 32 that is spring loaded to press roller 30 inwardly into chain 16. This causes a greater engagement of chain 16 with the teeth of the cog wheels about which it is mounted. The more teeth are engaged with chain 16, the more force may be transmitted from cog wheel set 12 to set 14. Also, the tension roller 30 serves the purpose of taking up the extra chain length that is necessary to allow the chain to successfully transit from one cog wheel to the next cog wheel and that accommodates the small changes in chain slack as the gears are changed in steps, as described below.

Referring to FIGS. 2, 4 and 5, to effect a shifting of gears, a cable 34 is pulled so that it rotates a guide-bar 36.

A set of chain shift channels 38 and a driven cog set shift channel 39, move a chain-shift guide-bar follower 40 and driven cog-set-shift guide-bar follower 42, which move the chain 16 and the driven cog wheel set 14 respectively in response to the rotation of guide-bar 36. A pair of slide rods 41 prevent follower 40 from rotating about guide-bar 36. Skilled persons will recognize that a bearing/coupling must be used to join follower 42 and cogwheel set 14 so that as follower 42 operatively pushes cogwheel set 14 it does not impede its rotation by way of frictional resistance. The bearing/coupling also makes it possible for follower 42 to move cogwheel set 14 by pulling on it transversely. Bearing/coupling devices are well known in the art.

Figure 6:
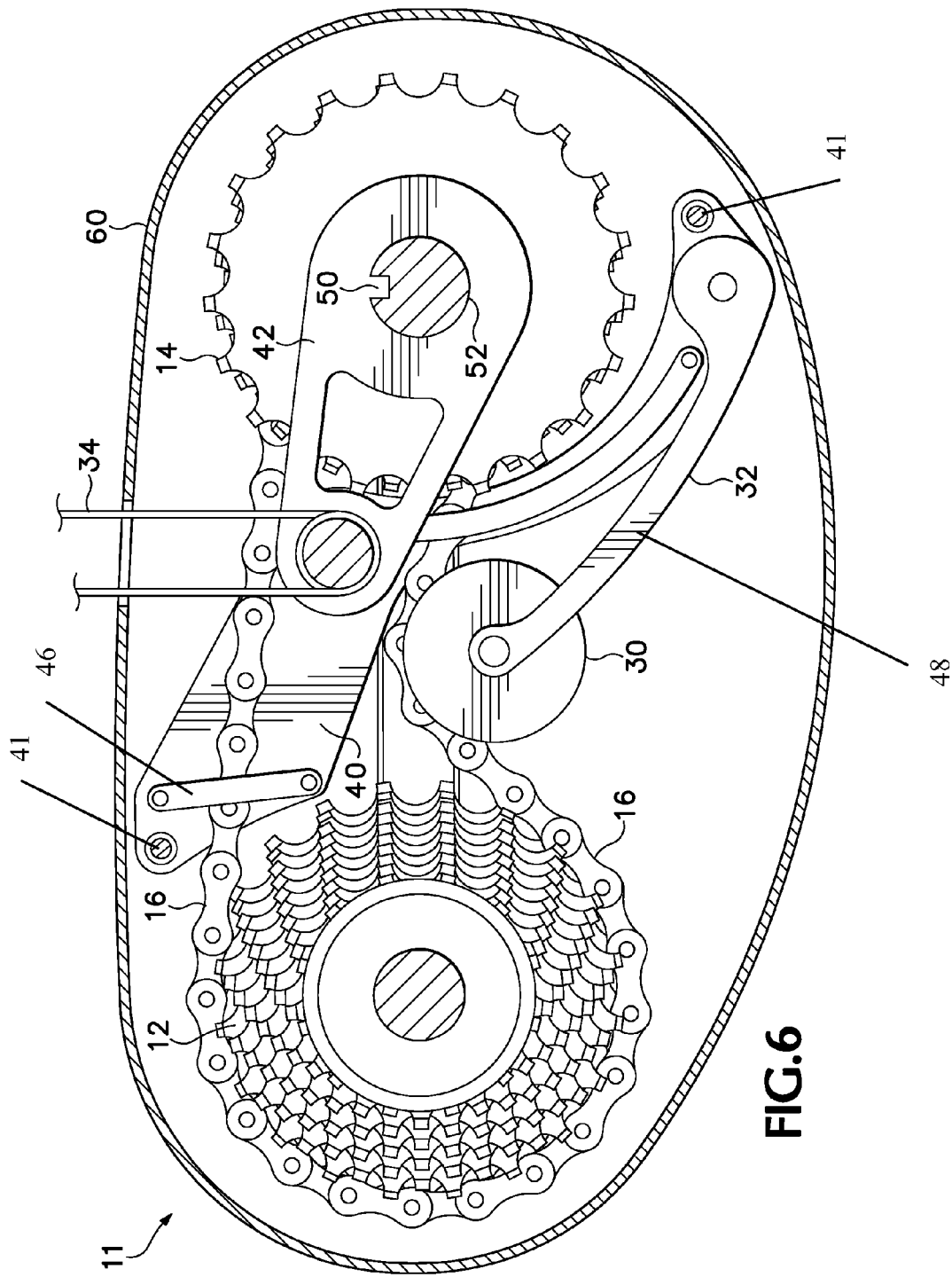
FIG. 6 is a sectional side view, taken along line 6-6 of FIG. 2.

To facilitate their movement, a pair of ball bearing sets 44 are mounted in followers 40 and 42 and set into guide-bar channels 38 and 39, respectively, to facilitate movement of followers 40 and 42. The chain-shift guide-bar follower 40 includes an upper chain cage 46, or loaded chain pushing element, (FIG. 6) and a lower chain cage 48, or unloaded chain pushing element, (FIG.6). Cage 46 surrounds the upper (loaded) run of chain 16 whereas cage 48 surrounds the lower (non-loaded) run of chain 16. Cages 46 and 48 provide the sideways loading on the chain 16 necessary to force chain deviation from the operational chain alignment plane, resulting in gear changes on both cog gear sets. In an alternative preferred embodiment, the guide-bar 36 is aligned with the general contour of the driven cog wheel set 14 (FIG. 2.) to maintain a generally consistent spacing between the cog wheels and the chain cage 48 across the cog wheel set.

Figure 3:
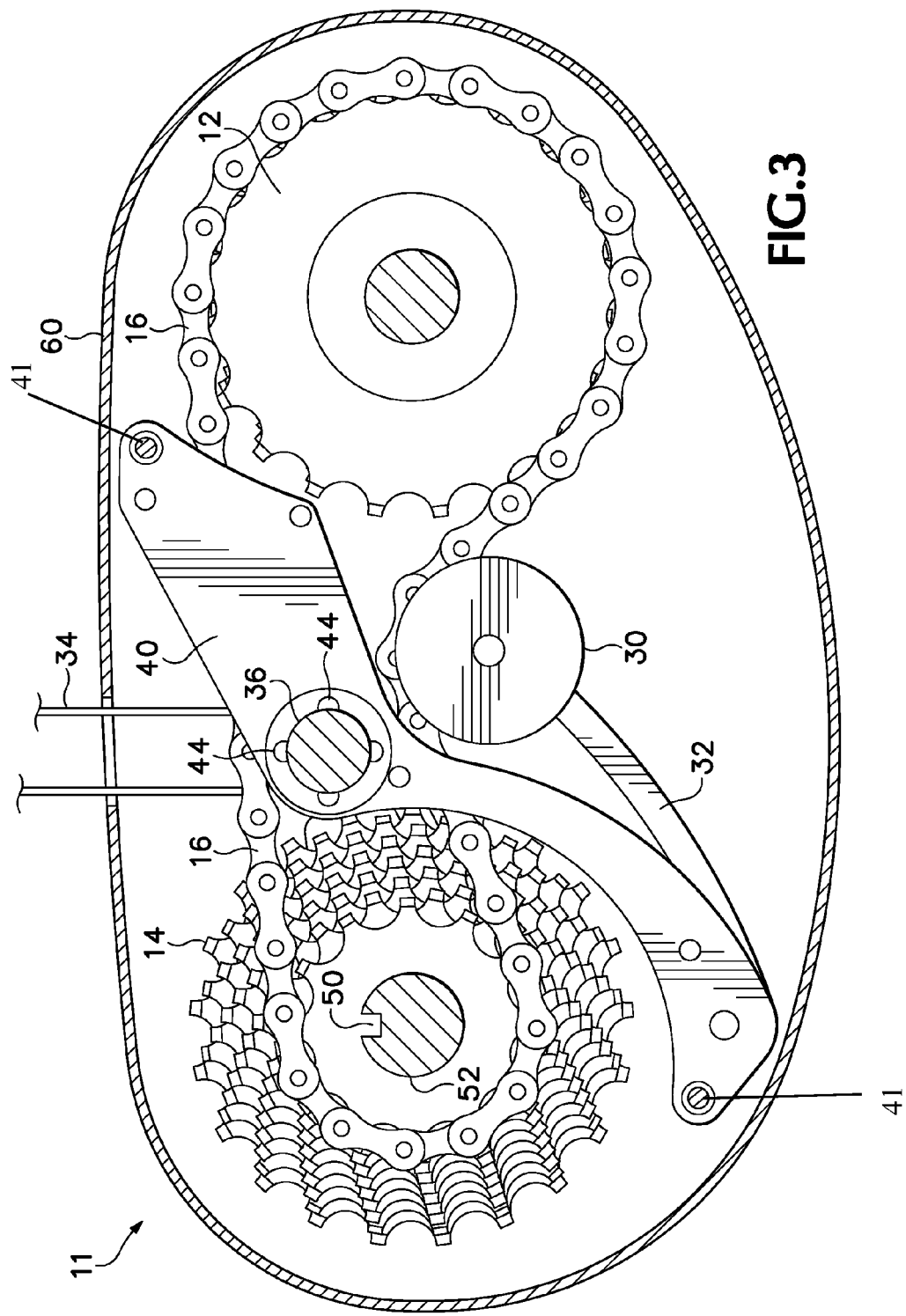
FIG. 3 is a sectional side view taken along line 3-3 of FIG. 2.

Facing in the direction of FIG. 3, a counterclockwise rotation of guide-bar 36, causes the chain to be moved into the paper. As the gear set 11 is shifted from the highest gearing, which is shown in FIGS. 2, 3 and 6, to the lowest gearing (not shown), chain 16 is shifted in alternating step types. In a first step type the chain is shifted from a smaller driven cog wheel 14 to a larger driven cog wheel 14, whereas in a second step type the chain is shifted from a larger drive cog wheel 12 to a smaller drive cog wheel 12.

In greater detail in the first step type, as dictated by driven set channel 39, the driven cog wheel set 14, following the back and forth pattern of channel 39 moves in the "out of the paper" (of FIG. 3) direction while chain 16 is kept stationary in the transverse dimension as guide-bar channels 38 are straight in this interval. As noted previously, in this first step type chain 16 moves from a smaller driven cog wheel 14 to a larger driven cog wheel 14. In the second step type, the driven wheel set 14, now reversed in direction due to the back and forth pattern of channel 39, is moved in tandem with the chain-shift guide-bar follower 40 and chain 16. This is because the portions of the chain shift channels 38 and the driven set channel 39 that run in the same helical pattern are now being used to move followers 40 and 42, respectively. As a result, upper cage 46 pushes the chain 16 to move from a larger drive cog wheel 12 to a smaller drive cog wheel 12. By repeating the first step and the second step type the chain 16 can be moved in steps and may be changed from the two highest gearing cog wheels of sets 12 and 14 to the two lowest gearing cog wheels of sets 12 and 14. Chain 16 remains in an operationally aligned plane in the transverse dimension, operationally normal to the cogwheel sets 12 and axis of rotation, after each gear change step is completed. The reverse process takes place when shifting from lowest gear to highest gear.

In an alternative preferred embodiment the two cog wheel sets are transversely displaced from each other by a one-half cog center-to-cog center spacing and this transverse positional relationship between the sets is left unchanged with only the chain being moved. In this embodiment the active cogwheels are always mutually misaligned by a one-half cog center-to-cog center spacing. Because this small misalignment is insufficient to induce a gear change to an adjacent cog wheel, without the aid of the gear change assembly, the engaged chain 16 remains in an operationally aligned plane in each gear, operationally normal to the cog sets 12 and 14 axis of rotation. This problem is addressed in various ways in various preferred embodiments, by use of various chain or other tension-member types and cog teeth geometries.

A spline 50 permits cog wheel 14 to be moved transversely back and forth and yet drive an axle 52, which is journalled to and drives drive cog wheel 20 (FIG. 1). A one way clutch 54 permits the rotation of drive cog wheel set 12 while the pedals 18 are stationary. A sturdy housing 60 of metal (steel or aluminum, for example) or a robust polymer protects gear box 11 from an intrusion of debris.

Skilled persons will appreciate that although cog wheel sets 12 and 14 are shown as being identical but rotated 180 degrees relative to each other, these sets need not be identical. In one preferred embodiment, each substantially aligned pair of cog wheels (one cog wheel from set 12 and the other from set 14) collectively has the same number of teeth as all the other substantially aligned cog wheel pairs. Although in other preferred embodiments this is not the case, there is an advantage for the case in which each aligned cog wheel pair collectively has a number of teeth that is not very different from the other, similar, aligned cog wheel pairs. The advantage is that a single tension roller 30, which provides more chain wrap on both cogs, is possible since in this embodiment the change in chain slack over the gearing range is small.

While a number of exemplary aspects and embodiments have been discussed above, those skilled in the art will recognize that it would be possible to make certain modifications, permutations, additions and sub-combinations thereof. It is therefore intended that the following appended claims and claims hereafter introduced are interpreted to include all such modifications, permutations, additions and sub-combinations as are within their true spirit and scope.

The invention claimed is:

1. A gear assembly, comprising:
   (a) a first drive cogwheel defining a first rotational axis;
   (b) a driven cogwheel defining a second rotational axis, parallel to and displaced from said first rotational axis,
   (c) a chain mounted about said first drive cogwheel and said driven cogwheel, linking said first drive cogwheel with said driven cogwheel, thereby defining a first gearing assembly, and a first gear;
   (d) a second drive cogwheel, co-axial to said first drive cogwheel, thereby forming a drive cogwheel set;
   (e) a rear wheel defining a third rotational axis, displaced from said first and said second rotational axis, and being operatively connected to and driven by said driven cogwheel;
   (f) a multi-step gear change assembly;
   (g) wherein a first movement of said multi-step gear change assembly results in a transition of said chain from said first drive cogwheel to said second drive cogwheel while remaining linked to said driven cogwheel, thereby defining a first gear change, a second gearing assembly and a second gear, wherein a second movement of said multi-step gear change assembly results in a return of said chain from said second drive cogwheel to said first drive cogwheel while remaining linked to said driven cogwheel, thereby defining a second gear change and a return to said first gear.

2. The gear assembly of claim 1, further including a chain pushing element wherein movement of said loaded chain pushing element results in the transition of said chain amongst said cogwheels of said drive cogwheel set.

3. The gear assembly of claim 2, wherein said movement of said loaded chain pushing element is in a direction parallel to said first rotational axis.

4. The gear assembly of claim 1, wherein said multi-step gear change assembly moves laterally, relative to said cogwheel set.

5. The gear assembly of claim 1, further including a second driven cog wheel, co-axial to said driven cogwheel thereby forming a driven cogwheel set, and wherein said gear change assembly also transitions said chain amongst said cogwheels of said driven cog wheel set.

6. The gear change assembly of claim 5, including a non-loaded chain pushing element, wherein said non-loaded chain pushing element pushes said chain amongst said cogwheels of said driven cogwheel set.

7. The gear assembly of claim 6, wherein said non-loaded chain pushing element moves laterally, relative to said drive cogwheel set.

8. The gear assembly of claim 6 wherein said non-loaded chain pushing element moves laterally, relative to said driven cogwheel set.

9. The gear assembly of claim 6, wherein said loaded chain pushing element moves in tandem with said non-loaded chain pushing element.

10. The gear assembly of claim 5 wherein said loaded chain pushing element moves laterally, relative to said driven cogwheel set.

11. The gear assembly of claim 5, wherein said loaded chain pushing element moves in tandem with said driven cogwheel set.

12. The gear assembly of claim 1, wherein said chain is a roller chain.

13. The gear assembly of claim 12, wherein said roller chain is made of metal.

14. The gear assembly of claim 1, wherein said chain is a metal chain.

15. A gear assembly comprising:
  (a) a first co-axial cogwheel set defining a first rotational axis, and including a first-set first cogwheel and a first-set second cogwheel of different sizes;
  (b) a second co-axial cogwheel set defining a second rotational axis, parallel to and displaced from said first rotational axis, and including a second-set first cogwheel and a second-set second cogwheel of different sizes;
  (c) a rear wheel defining a third rotational axis, displaced from said first and said second rotational axis;
  (d) a chain linking said first-set first cogwheel and said second-set first cogwheel thereby defining a first gearing assembly and a first operational chain alignment plane, operationally normal to said rotational axis;
  (e) a multi-step gear changing assembly adapted to move said chain from said first-set first cogwheel to said first-set second cogwheel, while linked on said second set first cogwheel, thereby defining a first step gear change, a second gearing assembly and a second operational chain alignment plane, and from said second-set first cogwheel to said second-set second cogwheel, thereby defining a second step gear change, a third gearing assembly and a third operational chain alignment plane; and
  (f) wherein said gear assembly provides a first operational gearing ratio when said chain is linked in said first gearing assembly, a second operational gearing ratio when said chain is linked in said second gearing assembly and a third operational gearing ratio when said chain is linked in said third gearing assembly.

16. The assembly of claim 15, wherein said first operational chain alignment plane is aligned with said second operational chain alignment plane.

17. The assembly of claim 15, further comprising a drive cogwheel operationally coupled to said second co-axial cogwheel set, a rear wheel cogwheel, operationally coupled to said rear wheel, and a tension-member loop mounted on said drive cogwheel and mounted on said rear-wheel cogwheel, wherein a rotation of said first cogwheel set results in a rotation of said wheel.

18. The assembly of claim 17 wherein said tension member loop is a roller chain.

19. The assembly of claim 18 wherein said roller chain is made of metal.

20. The assembly of claim 17 wherein said tension member loop is a metal chain.

21. The assembly of claim 15 wherein said chain is a roller chain.

22. The assembly of claim 21 wherein said roller chain is made of metal.

23. The assembly of claim 15 wherein said chain is a metal chain.

24. The assembly of claim 15, mounted on a single rider bicycle, further comprising a one-way clutch and a pair of pedals, wherein said one-way clutch allows said rear wheel to rotate, while said pedals do not rotate.

25. The assembly of claim 24, wherein said one way clutch allows said first cogwheel set to rotate, while said pedals do not rotate.

26. The assembly of claim 15, wherein said first-set second cogwheel remains positioned between said first operational chain alignment plane and said third operational chain alignment plane.

27. The assembly of claim 15, wherein said first-set second cogwheel has a range of travel between said second operational chain alignment plane and said third operational chain alignment plane.

28. The assembly of claim 15, wherein after said chain has been transitioned to said second gear ratio, said multi-step gear change assembly is capable of returning said chain to said first gear ratio instead of transitioning to said third gear ratio.

29. The gear assembly of claim 1, further including a pair of pedals attached to said drive cogwheel, wherein said rear wheel is mounted on a single rider bicycle, wherein said gear assembly is driven by said pair of pedals.

* * * * *